United States Patent
Allison

[11] 3,940,161
[45] Feb. 24, 1976

[54] INDEPENDENT WHEEL SUSPENSION FOR A MOTOR VEHICLE

[75] Inventor: William D. Allison, Grosse Pointe Farms, Mich.

[73] Assignee: Ford Motor Company, Dearborn, Mich.

[22] Filed: Dec. 23, 1974

[21] Appl. No.: 535,540

[52] U.S. Cl.......................... 280/96.2 R; 280/124 A
[51] Int. Cl.² ........................................... B60G 3/20
[58] Field of Search ....... 280/96.2 R, 124 R, 124 A; 403/227, 225

[56] References Cited
UNITED STATES PATENTS

| | | | |
|---|---|---|---|
| 2,455,343 | 11/1948 | Slack | 280/96.2 B |
| 3,061,329 | 10/1962 | Hintzen | 280/96.2 R |
| 3,073,617 | 1/1963 | Schultz | 280/96.2 R |
| 3,075,786 | 1/1963 | Freers | 280/96.2 R |

*Primary Examiner*—Philip Goodman
*Attorney, Agent, or Firm*—Clifford L. Sadler; Keith L. Zerschling

[57] ABSTRACT

An independent wheel suspension for a motor vehicle according to the present disclosure includes vehicle body structure, a wheel support member and upper and lower suspension arms which connect the body structure to the wheel support. A resilient pivot couples the outer end of the upper arm to the wheel support member and includes a ball and socket joint which has its socket secured to the arm and its ball connected to the wheel support by an annular resilient bushing. The resilient pivot isolates vibrations of the wheel support member from the upper arm. The resilient pivot also allows horizontal wheel movement when the wheel strikes a minor road obstacle such as tar strip or expansion joint in concrete pavement. Such horizontal wheel compliance attenuates the shock of the impact.

1 Claim, 2 Drawing Figures

INDEPENDENT WHEEL SUSPENSION FOR A MOTOR VEHICLE

BACKGROUND OF THE DISCLOSURE

The present invention relates to independent wheel suspensions for motor vehicles, and more particularly to a suspension construction that reduces noise, vibration and harshness in a vehicle. The present disclosure is directed to an independent suspension that isolates vibrations and impact shocks occurring at the wheel and wheel support member from being transmitted to the upper suspension arm and vehicle body.

BRIEF SUMMARY OF THE DISCLOSURE

According to the presently preferred embodiment of this invention, an independent wheel suspension for a motor vehicle includes a wheel support member that rotatably supports a road wheel. Upper and lower suspension arms connect the wheel support member to the vehicle body structure. The upper arm is coupled to the wheel support by a resilient pivot means that includes an annular resilient bushing and a ball and socket joint. The bushing is secured to the wheel support member and the socket portion of the joint is connected to the upper suspension arm. The ball stud of the joint is pivotally supported within the socket and has its shank secured in the resilient bushing.

The resilient element of the resilient bushing functions as an absorber or damper to isolate noise and vibration occurring at the wheel and in the wheel support member from being transmitted to the upper arm. In addition, the resilient element permits horizontal movement of the wheel support member and the wheel. This is advantageous for reducing the shock of minor road impacts upon the wheel. For an example, when the road wheel strikes a tar strip or expansion joint in concrete pavement, the impact will cause the wheel and the wheel support member to move horizontally due to the deformability of the resilient element of the bushing. As a consequence, the shock of the impact will be absorbed and not transmitted to the upper suspension arm and the vehicle body.

BRIEF DESCRIPTION OF THE DRAWINGS

The many objects and advantages of a motor vehicle suspension system constructed in accordance with this invention will become apparent upon consideration of the following detailed discussion and the accompanying drawings, in which.

DETAILED DESCRIPTION OF THE PRESENTLY PREFERRED EMBODIMENT

Figure 1:
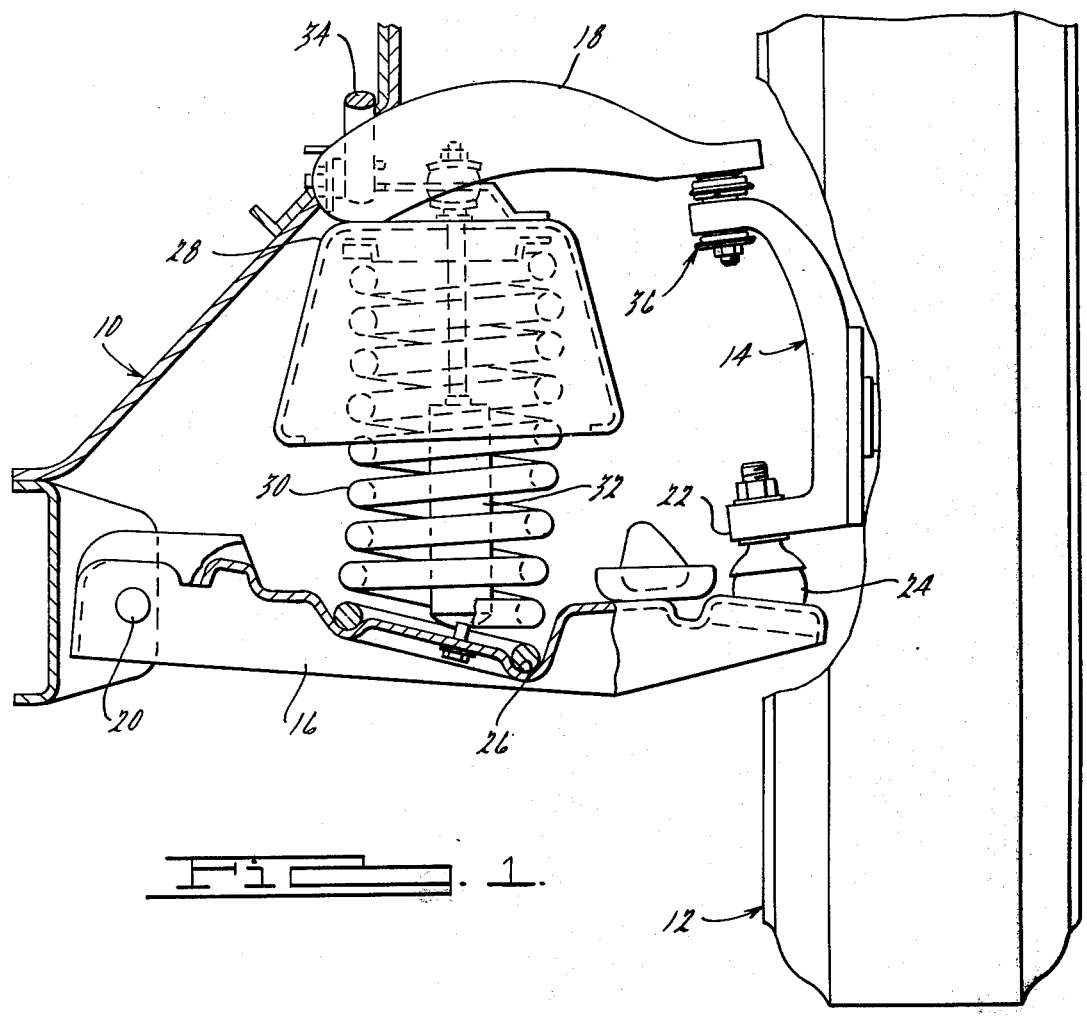
FIG. 1 is a front elevational view of an independent wheel suspension for a vehicle incorporating the preferred form of the invention.

Referring now to the drawings, wherein the presently preferred embodiment of this invention is illustrated, FIG. 1 discloses vehicle body structure 10, a road wheel 12 and a novel suspension system for connecting the wheel to the vehicle body.

The wheel 12 is rotatably supported on the spindle portion of a wheel support member 14. Lower and upper suspension arms 16 and 18 connect the wheel support member 14 to the vehicle body structure 10. The inner end of the lower arm 16 is pivotally connected by a pivot structure 20 to the body structure 10. The wheel support member 14 has an inwardly extending portion 22 and the outer end of the lower arm 16 is connected to the wheel support portion 22 by a ball joint assembly 24.

The arm 16 is provided with a spring seat 26. An upper spring seat 28 is welded to the vehicle body structure 10. A coil type suspension spring 30 is interposed between the lower and upper spring seats 26 and 28. Spring 30 supports a portion of the weight of the vehicle body upon the lower suspension arm 16 and the wheel 12. A telescopic hydraulic shock absorber 32 is arranged generally concentrically within the spring 30 and has its upper end connected to the spring seat 28 and its lower end connected to suspension arm 16.

Figure 2:
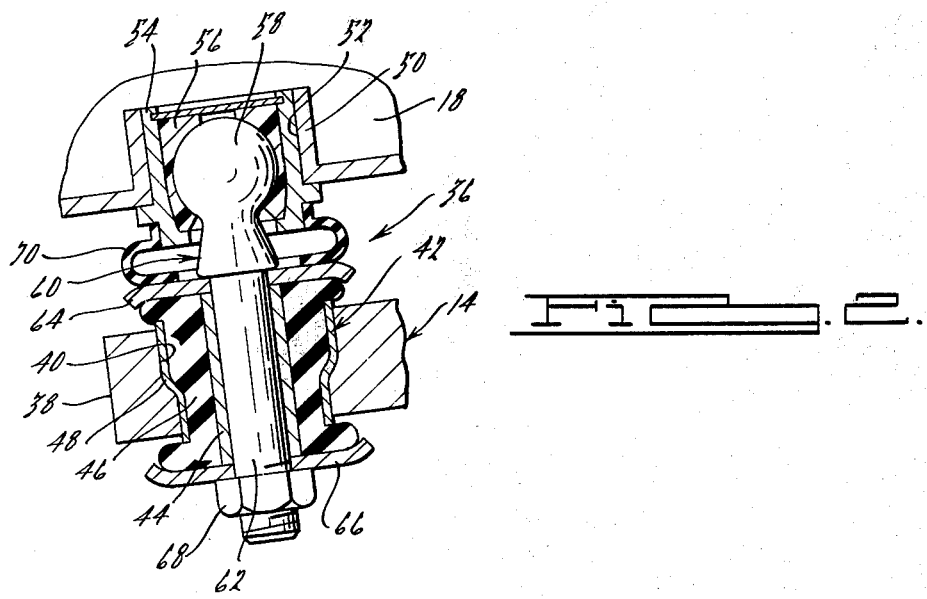
FIG. 2 is an enlarged sectional view of the resilient pivot between the upper suspension arm and wheel support member of FIG. 1.

A pivot shaft 34 supported on the body structure 10 pivotally connects the upper arm 18 to the vehicle body. A resilient pivot 36 connects the outer end of the arm 18 to the wheel support member 14. The construction of the resilient pivot 36 is shown in FIG. 2. The upper end of wheel support member 14 has an inwardly extending portion 38 which is provided with a stepped bore 40 and an annular resilient bushing 42 is positioned in the bore 40. The bushing 42 comprises an inner rigid cylindrical sleeve 44 that is surrounded by an annular elastomeric element 46. An outer rigid sleeve 48 surrounds the elastomeric element 46. The outer sleeve 48 has portions of two different diameters and is retained within the bore 40 by means of a press fit.

The upper suspension arm 18 is provided with a cylindrical flange 50 which forms a hole 52. A ball and socket joint has a socket portion 54 retained in the hole 52 by means of an interference fit with the flange 50. The socket 54 contains a bearing 56 in which the head 58 of a ball stud 60 is pivotally supported. The shank portion 62 of the stud 60 extends downwardly through the center of the inner sleeve 44 of the bushing 42.

A washer 64 is positioned about the shank 62 and is interposed between the upper end of the inner sleeve 44 and a shoulder formed by the head 58 of the ball stud 60. A second washer 66 is positioned about the other end of the shank 62 and against the lower end of the inner sleeve 44. A nut 68 is threadedly tightened on the end of the shank 62 whereby the elastomeric element 46 is compressed between the washers 64 and 66. The ends of the element 46 are distorted outwardly as seen in FIG. 2. The length of the inner sleeve 44 controls the extent to which the element 46 may be compressed.

An annular boot seal 70 is positioned about the open end of the socket 54 and against the washer 64. It retains lubricant within the ball joint and prevents contamination of the bearing 56.

THE OPERATION

During normal operation of the motor vehicle of FIG. 1, the wheel 12 will traverse a jounce and rebound path in accordance with road irregularities. During such movement the arms 16 and 18 will pivot with respect to the body structure 10 and the wheel support member 14. The suspension spring 30 resiliently supports a portion of the mass of the vehicle upon the lower arm 16 and the wheel 12. Movement of the lower arm 16 with respect to the body structure 10 will be damped by the hydraulic shock absorber 32.

FIG. 1 illustrates a front wheel suspension. The wheel 12 and wheel support 14 are steerable about a vertical axis extending through the center of the lower ball joint 22 and the upper pivot 36.

Noise and vibrations will occur at the wheel 12 as it traverses a road. These disturbances will also be present in the wheel support member 14. The elastomeric element 46 of the bushing 42 functions as an absorber or damper to attenuate the transmission of the vibrations from the wheel support member 14 to the upper arm 18.

The elastomeric element 46 also functions as a means for preventing the transmission of minor impact shocks to the upper arm 18. When the wheel 12 strikes a minor obstacle, such as a tar strip expansion joint in concrete pavement, forces will be imposed upon the wheel 12 and the wheel support member 14 tending to cause their horizontal displacement. The resiliency of the element 46 will permit the wheel 12 and wheel support 14 to be displaced rearwardly in response to a minor impact load of this type. As a result of this deflection, the shock of such impact will not be conveyed to the upper arm 18 and the vehicle body structure 10.

A motor vehicle having a wheel suspension of the type disclosed in FIG. 1 will, therefore, be characterized by its smooth operation and reduced vibration and harshness.

The foregoing description presents the presently preferred embodiment of this invention. Details of construction have been disclosed for purposes of illustration rather than limitation. Modifications and alterations of the invention may occur to those skilled in the art that will come within the scope and spirit of the following claims.

I claim:

1. A wheel suspension system for a motor vehicle comprising:

vehicle body structure, a steerable wheel support member and suspension means interconnecting said body structure and said wheel support member;

said suspension means including upper and lower suspension arms pivotally connected to said body structure;

pivot means connecting said lower arm to said wheel support member;

a suspension spring interposed between said lower arm and said body structure;

resilient pivot means connecting the outer end of said upper arm to said wheel support member;

said resilient pivot means comprising an elastomeric bushing and a ball and socket joint;

said elastomeric bushing including an inner rigid sleeve, an intermediate annular elastomeric element and an outer rigid sleeve;

said rigid sleeves and said elastomeric element having coaxial axes arranged generally vertical;

said ball and socket joint having a ball stud with a shank portion positioned in and secured to said inner rigid sleeve;

said ball and socket joint also having a socket positioned about a ball end of said ball stud;

said socket of said ball and socket joint being rigidly secured to said upper suspension arm;

said outer sleeve of said elastomeric bushing being rigidly secured to said wheel support member;

said elastomeric element being constructed to permit resilient horizontal deflection of said wheel support member relative to said upper suspension arm and thereby attenuate the transmission of vibrations from said wheel support member to said upper suspension arm;

a nut threadedly engaging the end of said ball stud and constructed to compressively load said elastomeric element thereby increasing the spring rate of said elastomeric element resisting said resilient horizontal deflection of said wheel support member relative to said upper suspension arm;

said inner sleeve surrounding said shank constructed to limit the compressive loading of said elastomeric element and thereby limit the spring rate of said elastomeric element.

* * * * *